(12) United States Patent
Symborski et al.

(10) Patent No.: US 12,423,312 B1
(45) Date of Patent: Sep. 23, 2025

(54) ADAPTIVE DATA SCORING USING MULTI-METRIC INTERACTION ANALYSIS

(71) Applicant: Intuit Inc., Mountain View, CA (US)

(72) Inventors: John Patrick Symborski, Edmonton (CA); Siddharth Jain, Mountain View, CA (US); Rachit Debashish Sengupta, San Diego, CA (US); Jianzhao Huang, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 18/987,816

(22) Filed: Dec. 19, 2024

(51) Int. Cl.
| | |
|---|---|
| G06F 16/22 | (2019.01) |
| G06F 16/2457 | (2019.01) |
| G06F 16/248 | (2019.01) |
| G06F 16/953 | (2019.01) |

(52) U.S. Cl.
CPC .... G06F 16/24578 (2019.01); G06F 16/2237 (2019.01); G06F 16/248 (2019.01); G06F 16/953 (2019.01)

(58) Field of Classification Search
CPC .......... G06F 16/24578; G06F 16/2237; G06F 16/248; G06F 16/953
See application file for complete search history.

(56) References Cited

U.S. PATENT DOCUMENTS

| | | | | |
|---|---|---|---|---|
| 9,235,637 | B1* | 1/2016 | Kamvar | G06F 16/3322 |
| 12,254,029 | B1* | 3/2025 | Veillon | G06F 16/285 |
| 12,259,896 | B1* | 3/2025 | Chowdhary | G06F 16/3347 |
| 12,306,828 | B1* | 5/2025 | Chakraborty | G06F 16/24522 |
| 2012/0209838 | A1* | 8/2012 | Dean | G06Q 30/0246 |
| | | | | 707/727 |
| 2024/0184834 | A1* | 6/2024 | McCann | G06N 3/0475 |
| 2024/0346256 | A1* | 10/2024 | Qin | G06F 40/216 |
| 2024/0355064 | A1* | 10/2024 | Skrypnyk | G06T 17/20 |
| 2024/0355065 | A1* | 10/2024 | Miller | G06T 19/006 |
| 2025/0069120 | A1* | 2/2025 | Kim | G06F 16/9532 |

(Continued)

OTHER PUBLICATIONS

"Retrieve & Re-Rank", https://sbert.net/examples/applications/retrieve_rerank/README.html, Jan. 1, 2024, 4 pages.

(Continued)

*Primary Examiner* — Jorge A Casanova
(74) *Attorney, Agent, or Firm* — Lathrop GPM LLP (57) ABSTRACT

A method includes obtaining, as a response to a user query, a multitude of search results and corresponding similarity scores. The method further includes obtaining a multitude of data sources corresponding to the multitude of search results. The method further includes processing a multi-metric analytic function for the search results, and corresponding data sources to obtain a composite score for the search results. The method further includes selecting a subset of search results from the multitude of search results based on a composite score threshold to obtain a selected subset of search results. The method further includes selecting a corresponding subset of data sources from the multitude of data sources to obtain a selected subset of data sources. The method further includes generating a prompt to a large language model (LLM), including at least the user query, the selected subset of search results, and the selected subset of data sources.

20 Claims, 5 Drawing Sheets

(56) References Cited

U.S. PATENT DOCUMENTS

2025/0245124 A1* 7/2025 Jones ..................... G06N 3/09
2025/0245218 A1* 7/2025 Longoni ............... G06F 16/248

OTHER PUBLICATIONS

"Weighted Sum Method—Multi Criteria Decision Making—GeeksforGeeks", https://geeksforgeeks.org/weighted-sum-method-multi-criteria-decision-making/, Dec. 24, 2021, 13 pages.

* cited by examiner

```
##Prompt to Search application##
Generate a GraphQL query for me to find the first
names of all customers of the ABC application.
```
— 402

```
Results from vector store:
Search result              Data source           Raw score
Customer_first_name        XYZ_Application       0.65
First_name                 Employee_Payroll      0.32
firstName                  ABC_application       0.87
Customer_first_name        Test_schema           0.55
First_name_field           DO_NOT_USE_Schema     0
GraphQL query              GitHub                0.65
```
— 404

```
Composite Scores for results:
                       Metrics :  Frequency    Latency  Last Updated   Composite
Search result          Data source  Accessed                            Score
Customer_first_name    XYZ_Application  10234   100    10-10-2024       0.75
First_name             Employee_Payroll 20543   25     11-22-2024       0.35
firstName              ABC_application  11769   37     11-25-2024       0.95
Customer_first_name    Test_schema      500     250    08-09-2024       0.65
First_name_field       DO_NOT_USE_Schema 0      0      XX-XX-XXXX       0
GraphQL query          GitHub           35078   18     11-30-2024       0.95
```
— 406

```
##Machine Generated Prompt:
Process the request "Generate a GraphQL query for me to find the first names of all customers of the ABC
application" using "ABC_application" schema and "GitHub"
LLM Response:
query {
  ABC_Application {
    allCustomers {
      firstName
    }
  }
}
```
— 408

ADAPTIVE DATA SCORING USING MULTI-METRIC INTERACTION ANALYSIS

BACKGROUND

Large language models (LLMs) are large-scale machine learning models, trained on billions of parameters and vast amounts of document corpora, image, video and audio corpora to gain advanced natural language, image, video, and audio processing capabilities. Pre-trained LLMs may be deployed in enterprises as natural language processing engines of enterprise-specific search applications, such as co-pilot applications, chatbots, or intelligent agents, etc. In enterprise-specific search applications, users may enter queries in natural language. The user queries may be directed to information that is proprietary to the enterprise. The user queries may be pre-processed by an enterprise search engine. The search engine may retrieve search results corresponding to the user queries from the various data sources of diverse types of the enterprise, for example, various document corpora, or relational database schemas, graph database schemas, etc. The search results may be sent to the LLM to generate a natural language response, code segments, examples etc., as an answer to the user query.

Notably, in generating the answer, the LLM may consider the search result content per se. Specifically, the LLM may not assess or evaluate the data sources from whence the search results originate. Likewise, the search engine may not assess or evaluate the data sources while retrieving search results. However, the quality of answers generated by the LLM depends on the search result, which in turn depends on the data source from which the search result originates. Thus, a challenge arises in assessing the quality and relevance of a data source of a search result for a user query.

Further, the data sources in an enterprise may be associated with heuristic metadata pertaining to usage, content criticality, and other performance factors of the data sources. For example, a data source may be associated with heuristic metadata including frequency of retrieval, most recent update, latency, relevance, etc. This heuristic metadata may not be leveraged to optimize the speed of retrieval of search results, relevancy of search result, nor in response generation. Thus, a further challenge arises in leveraging the heuristic metadata of a data source to assess the quality, usability, and relevance of the data source of a search result.

Retrieval augmented generation (RAG) is a technique used to enhance the performance of LLMs by integrating information retrieved from external knowledge sources into their responses, that is, data sources that were not initially used to train the LLM. The efficacy of RAG is dependent on the quality of these data sources. Thus, yet another challenge arises in assessing the quality and relevance of the data sources to provide to the LLM for retrieval augmented generation.

SUMMARY

In general, in one aspect, one or more embodiments relate to a method. The method includes obtaining, as a response to a user query, a multitude of search results and corresponding similarity scores. The method further includes obtaining a multitude of data sources corresponding to the multitude of search results. The method further includes processing a multi-metric analytic function for the search results, and corresponding data sources to obtain a composite score for the search results. The method further includes selecting a subset of search results from the multitude of search results based on a composite score threshold to obtain a selected subset of search results. The method further includes selecting a corresponding subset of data sources from the multitude of data sources to obtain a selected subset of data sources. The method further includes generating a prompt to a large language model (LLM), including at least the user query, the selected subset of search results, and the selected subset of data sources.

In general, in one aspect, one or more embodiments relate to a system. The system includes at least one computer processor and a data repository. The system further includes a search engine, executing on the at least one computer processor. The system further includes a decision engine, executing on the at least one computer processor, a large language model (LLM) executing on the at least one computer processor, and a result ranking engine, executing on the at least one computer processor. The result ranking processor is configured to obtain, from the search engine, as a response to a user query, a multitude of search results and corresponding similarity scores. The result ranking engine is further configured to obtain a multitude of data sources corresponding to the multitude of search results. The result ranking engine is further configured to process a multi-metric analytic function for a search result of the multitude of search results, and a data source of the multitude of data sources that corresponds to the search result, to obtain a composite score for the search result. The result ranking engine is further configured to select a subset of search results from the multitude of search results based on a composite score threshold to obtain a selected subset of search results. The result ranking engine is further configured to select a corresponding subset of data sources from the multitude of data sources to obtain a selected subset of data sources. The result ranking engine is further configured to cause the decision engine to generate a prompt to the LLM, including at least the user query, the selected subset of search results, and the selected subset of data sources. The result ranking engine is further configured to cause the decision engine to retrieve a second set of search results from the selected subset of data sources. The result ranking engine is further configured to cause the LLM to process the selected subset of search results and the second set of search results to generate a natural language response to the user query. The natural language response is displayed in a search application.

In general, in one aspect, one or more embodiments relate to a method. The method includes receiving a user query from a search application and obtaining a multitude of search results corresponding to the user query from a vector store. The method further includes obtaining a multitude of data sources corresponding to the multitude of search results. The method further includes determining composite scores corresponding to the multitude of search results by processing the multitude of data sources by a multi-metric analytic function. The method further includes selecting a subset of search results from the multitude of search results based on a composite score threshold to obtain a selected set of search results. The method further includes selecting a corresponding subset of data sources from the multitude of data sources to obtain a selected set of data sources. The method further includes generating a prompt to a large language model (LLM) including the user query, the selected set of search results, and the selected set of data sources. The method further includes generating, by the LLM, an answer to the user query, in response to the prompt.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to scoring of data source(s) as a potential knowledge source for answering a given user query. Scoring refers to ranking the data source based on an assessment of the quality and relevance of data sources with respect to the user query. The data source may be initially identified as the origin of a search result corresponding to the given user query. The data source of the search result may be scored based on multiple metrics. A metric is an attribute of the data source, pertaining to the desirability of the data source as a potential knowledge source for answering the given user query. A metric may be considered as a beneficial metric, that is, positively correlating to the desirability of the data source as a potential knowledge source for answering the given user query. Similarly, a metric may be considered as a non-beneficial metric, negatively correlated with the desirability of the data source as a potential knowledge source for answering the given user query. Metrics may have positive and negative beneficial labeling based on whether it is desirable for a particular system that a particular metric be higher. For example, if, within the enterprise search application, a preferred data source has a specific metric being higher, that metric is desirable and labeled as a beneficial metric. The metrics of a data source may be obtained from heuristic metadata related to the data source.

The data source of a given search result corresponding to a user query may be scored based on a multi-metric analytic function. The multi-metric analytic function may score the data source based on multiple individual metrics of the data source. The multi-metric analytic function further considers pair-wise metric interaction of a data source. Pair-wise metric interaction captures a cumulative mutual effect of two metrics on the desirability of a data source. For example, the interaction of a pair of beneficial metrics may increase the desirability of the data source as a potential knowledge source. In another example, the interaction of a beneficial metric paired with a non-beneficial metric may have a mutually counteractive effect on the desirability of the data source. The multi-metric analytic function generates a composite score. The composite score may be assigned to the search result that was retrieved from the data source.

The set of search results with composite scores may be ranked and down-selected to obtain a subset of search results with composite scores above a composite score threshold. A corresponding subset of data sources may be selected. The subset of search results and corresponding subset of data sources may be provided to an LLM for RAG-based applications. Further, search systems, recommendation models, classification models, and anomaly detection models, may use the provided subset of search results and corresponding subset of search results for processing. The above examples may represent use cases an initial search is performed, the initial search results are re-ranked, and these re-ranked search results and data sources are provided to a model for final decision making.

Figure 1:
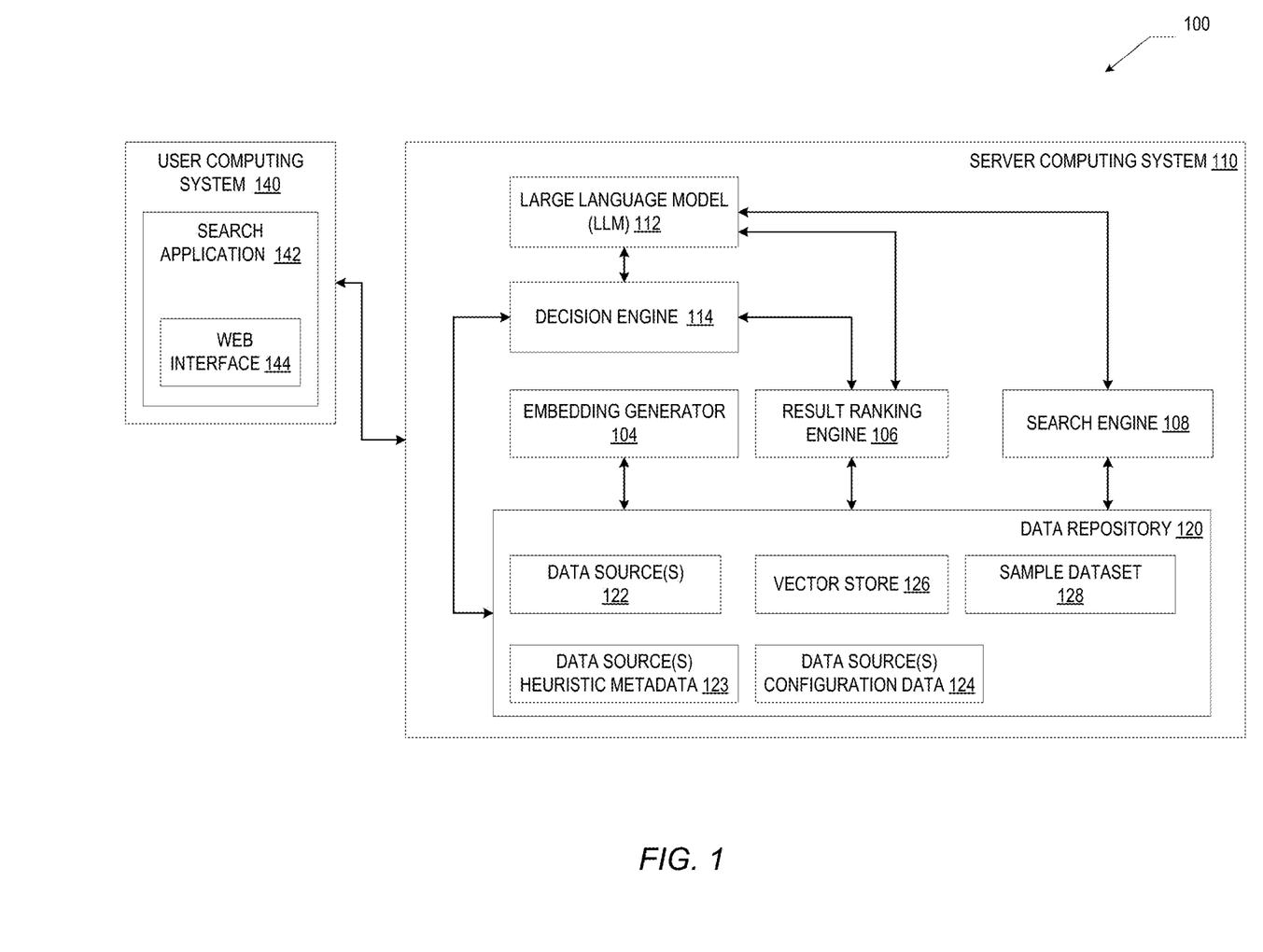
FIG. 1 shows a computing system, in accordance with one or more embodiments.

Attention is now turned to the figures. FIG. 1 shows a computing system (100), in accordance with one or more embodiments. The system (100) shown in FIG. 1 includes a server computing system (110). The server computing system (110) is one or more computer processors, data repositories, communication devices, and supporting hardware and software. The computer processor is one or more hardware or virtual processors which may execute computer readable program code that defines one or more applications, such as the embedding generator (104), the result ranking engine (106), the search engine (108), the large language model (LLM) 112, and the decision engine (114). An example of the computer processor is described with respect to the computer processor(s) (502) of FIG. 5A. Thus, the server computing system (110) is configured to execute one or more applications on the one or more computer processors, such as the embedding generator (104), the result ranking engine (106), the search engine (108), the large language model (LLM) 112, and the decision engine (114). The server computing system (110) may be in a distributed computing environment. An example of a computer system and network that may form the server computing system (110) is described with respect to FIG. 5A and FIG. 5B.

The system (100) shown in FIG. 1 includes a data repository (120). The data repository (120) is a type of storage unit or physical storage device (e.g., a file system, database, data structure, or any other storage mechanism) for storing data. The data repository (120) may include multiple different, potentially heterogeneous, storage units and/or storage devices. The data repository (120) includes one or more data source(s) 122. The one or more data source(s) (122) include diverse document stores, databases, log data, storing information that is particular to, and proprietary of, an enterprise. Examples of data sources include document corpora stored in document management systems, such as Google® Docs, Microsoft® OneDrive, etc. Other examples include relational databases, non-relational databases, graph databases, etc. The data repository further includes heuristic metadata (123) relating to the one or more data source(s) (122). Heuristic metadata refers to data pertaining to a data source that is not part of the content of the data source. For example, a data source may be a document management system including text documents, spreadsheets, presentations, etc. The content of the document management system may refer to the text documents, spreadsheets, presentations, etc., within the document management system. Additionally, there may be metadata associated with the document management system which is not part of the content of the document management system. For example, the metadata of the document management system may include information related to the content, such as date uploaded, date of most recent update, version information, owner information, etc. Further, based on the usage patterns of the data source, system administrators may include heuristic data, such as number of times accessed, number of times programmatically invoked via API calls, latency times of retrieval, etc. Heuristic data of a data source may include positive characteristics and negative characteristics of the data source. Some examples of heuristic data are: number of reviewers/ approvers of a source (positive), Refresh rate over time—i.e., number of refreshes per week (positive), citation count (positive), number of unique authors (positive), click through rates (positive), thumbs up/thumbs down rating (positive/negative), typo count-number of detected spelling/grammatical mistakes (negative).

The data repository (120) further includes data source(s) configuration data (124). The data source(s) configuration data (124) may include data source metrics and corresponding metric weights. The data source metrics are attributes of the data source heuristic metadata. For example, a data source that is a database may include metrics for latency time, most recent update, frequency of updates, access frequency, etc. The aforementioned data source metrics may be assigned weights. The weight of a data source metric quantifies the influence of the data source metric on the desirability of the data source. The greater the weight of the data source metric, the greater the influence of the metric on the desirability of the data source. The aforementioned condition holds true for both beneficial metrics (positive correlation with desirability) and non-beneficial metrics (negative correlation with desirability) of the data source.

The data repository (120) further includes a vector store (126). The vector store (126) is a large-scale vector database that includes embeddings of the content of the data source(s) (122). The embeddings are vector representations of the content of the data source(s) (122). The embeddings for the content of the data source(s) (122) may be generated by the embedding generator (104). The vector store (126) may be searchable by the search engine (108). Although shown as part of the data repository (120), in one or more embodiments, the vector store (126) may be a part of the search engine (108). Examples of vector stores include Elasticsearch®'s Native Vector search, Milvus®, Pinecone®, Weaviate®, etc.

The vector store (126) may be populated with embeddings of the content of the data source(s) (122) in an initialization phase of the system shown in FIG. 1. In one or more embodiments, content from the data sources(s) (122) may be inputted to the embedding generator (104). The embedding generator (104) may generate embeddings for the content. The embeddings may be vector representations of the content of at least one data source(s), for example, text, database records, image, video etc. Further the embeddings may be added to the vector store (126). When the search engine (108) searches the vector store (126) the search engine may retrieve one or more embeddings as search results. The search results may be matches to an embedding of a user query, based on a measure of vector similarity, for example, cosine similarity. For example, an embedding from the vector store is similar to an embedding of a user query is indicative that the respective embeddings are close to each other in the vector space. A match may be determined based on a vector similarity measure, for example, a cosine similarity value being higher than a similarity threshold.

The data repository (120) includes one or more sample dataset(s) (128). A sample dataset is a set of search results corresponding to one or more originating user queries and corresponding data sources. The originating user queries may be representative of a particular use case of requesting enterprise information. In one or more embodiments, the sample dataset corresponding to a particular use case may be manually selected by human experts. The criteria for selecting the originating user queries and corresponding search results may include, for example, frequency of occurrence of similar user queries, patterns of user query sequences that may characterize a particular workflow of data access, user feedback/satisfaction ratings of the search results, etc. Further the sample dataset may have queries selected to cover a broad area of the data sources to be assigned initial weights. A goal of selecting the queries, is that when combined, the sample dataset of queries provides a comprehensive coverage of the range of questions that may be asked on a data set with these sources.

By way of example, a developer may request a GraphQL code snippet as a first request, to obtain customer first names corresponding to customers of a particular online application/service. The first request may be followed by a second request of a GraphQL code snippet to obtain customer email addresses. A final request may be for a GraphQL code snippet to obtain the latest regulatory/compliance updates pertaining to the particular online application/service. A human expert may characterize this pattern of requests as an attempt to update customers by email of a regulatory change pertaining to the particular online application/service. Further, human experts may select search result datasets corresponding to one or more of these requests individually, or as a group, to analyze the data sources used to obtain the search results.

From analyzing the data sources, and other factors such as user feedback, search result relevance, etc., metrics for the data sources used for obtaining the search results corresponding to the particular (set of) user queries may be assigned a weightage, or a weight value, with respect to a particular use case. Thus, the sample dataset(s) characterize a particular use case. The metrics of the data sources used to obtain search results for the particular use case may be annotated with weight values particular to the use case. Additionally, a particular metric may have a raw score. The raw score of a metric may be multiplied by the weight value of the metric in the multi-metric analysis function to capture the influence of the metric on the desirability of a data source in the particular use case. For example, a data source that is updated every hour may have a raw score for a metric relating to update rate. Further, in a use case in which the frequency of updates is a critical factor, the weight assigned to the update rate may be high. Conversely, in a use case in which the frequency of updates is not a critical factor, the weight assigned to the update rate for the same data source may be low. Notably, the raw score for the update rate metric may be the same, however, the weightage imparted to the same metric of the same data source may differ across use cases.

The server computing system (110) further includes an embedding generator (104). The embedding generator (104) is software or application specific hardware, which when executed by the server computing system (110) on at least one computer processor, generates vector embeddings for the content of the data source(s) (122). As shown in FIG. 1, the embedding generator (104) may be representative of a single embedding generator capable of generating embeddings (vector representations) of many different data types, such as natural language, images, video, audio, etc. Additionally, or alternatively, the embedding generator (104) may be representative of multiple embedding models, corresponding to diverse data types. Examples of embedding generators include Word2Vec, Sentence Bidirectional Encoder Representations from Transformers (SBERT) for natural language, Graph2Vec or NodeSage for embedding generation of GraphQL schemas modeled as graphs, etc. Use of the embedding generator (104) is described with respect to FIG. 2.

The server computing system (110) further includes a result ranking engine (106). The result ranking engine (106)

is software or application specific hardware, which when executed by the server computing system (110) on at least one computer processor, processes a multi-metric analytic function initialized with parameters obtained from a data source corresponding to a search result. The parameters may include data source metric weights, and pair-wise metric interaction coefficients. The parameters for the data source corresponding to the search result may be obtained from data source(s) configuration data (124). The multi-metric analytic function may generate a composite score for the search result. Use of the result ranking engine (106) is described with respect to FIGS. 2 and 3.

The server computing system (110) further includes a search engine (108). The search engine (108) is software or application-specific hardware, which, when executed by the server computing system (110) on at least one computer processor, searches the vector store (126) for embeddings that are similar to an embedding (vector representation) of a user query. In one or more embodiments, the user query may be received by the server computing system (110) from a search application (142) executing on a user computing system (140). The similarity of an embedding in the vector store (126) to the user query embedding refers to the distance between the vectors in the vector space. The similarity between two embeddings may be measured by diverse similarity functions. Examples of similarity functions include cosine similarity, Euclidean distance, Dot product, etc. Examples of search engines that perform vector search include Elasticsearch®, OpenSearch®, Vespa®, Milvus® search engine, Pinecone® search engine, Weaviate® search engine, etc. Thus, matching between an embedding from the vector store (126) and the user query embedding may be determined by a similarity function value of the embedding and the user query embedding being higher than a similarity threshold.

The server computing system (110) further includes a decision engine (114). The decision engine (114) is software or application-specific hardware, which, when executed by the server computing system (110) on at least one computer processor, may generate a prompt for the LLM. The generated prompt may include at least the user query, a subset of search results obtained from the result ranking engine (106), and data source identifiers that identify data sources corresponding to the subset of search results. The generated prompt provides a fuller, integrated context of the user query to the LLM. The generated prompt may be processed by the LLM, to output an answer to the user query. The answer generated by the LLM may be based on the subset of search results and additional information obtained from the corresponding data sources. As a general overview, decision engines in RAG-based answer generation workflows retrieve relevant information from external knowledge sources, such as databases, documents, or APIs. The retrieved information is then integrated with the user's query to provide context. The LLM's understanding of the query is improved, resulting in more accurate and contextually appropriate responses.

The server computing system (110) also includes a large language model (LLM) (112). The LLM (112) is a natural language processing machine learning model. An example of the LLM (112) may be CHATGPT®. However, many different language models may be used. In one or more embodiments, the LLM (112) may be programmatically invoked via an LLM agent. LLM agents leverage LLMs to autonomously perform tasks, make decisions, and interact with users or other systems.

The system shown in FIG. 1 may include one or more user computing system(s) (140). The user computing system (140) may include a search application (142) with a web interface (144). The user computing system (140) may be considered remote or local. A remote user computing system (140) may be operated by a third-party (e.g., an end user of a chatbot) that does not control or operate the system of FIG. 1. Similarly, the organization that controls the other elements of the system of FIG. 1 may not control or operate the remote user computing system (140). Thus, a remote user computing system (140) may not be considered part of the system of FIG. 1.

In contrast, a local user computing system (140) may be operated under the control of the organization that controls the other components of the system of FIG. 1. Thus, a local user computing system (140) may be considered part of the system of FIG. 1. For example, a software developer of the organization may use a local user computing system (140) to access developer documentation. The software developer may enter a query in the search application (142) via the web interface (144), requesting a code snippet, explanatory documentation, API call syntax, etc.

Figure 5A:
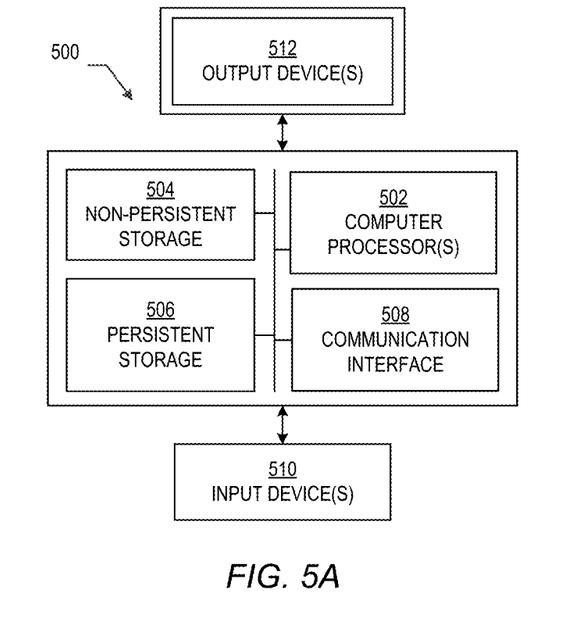
FIG. 5A and FIG. 5B show a computing system, in accordance with one or more embodiments.

In either case, the user computing system(s) (140) are computing systems (e.g., the computing system (500) shown in FIG. 5A) that communicate with the server computing system (110).

The user computing system (140) may send a user query to the server computing system (110) via the search application (142). Further, the search application (142) may display a natural language response. In one or more embodiments, displaying a natural language response may entail a user entering a user query via the web interface (144), and the search application (142) transmitting the user query to the server computing system (110), further, the search application (142) receiving a natural language response from the server computing system (110) displaying the natural language response on the web interface (144).

While FIG. 1 shows a configuration of components, other configurations may be used without departing from the scope of one or more embodiments. For example, various components may be combined to create a single component. As another example, the functionality performed by a single component may be performed by two or more components.

Figure 2:
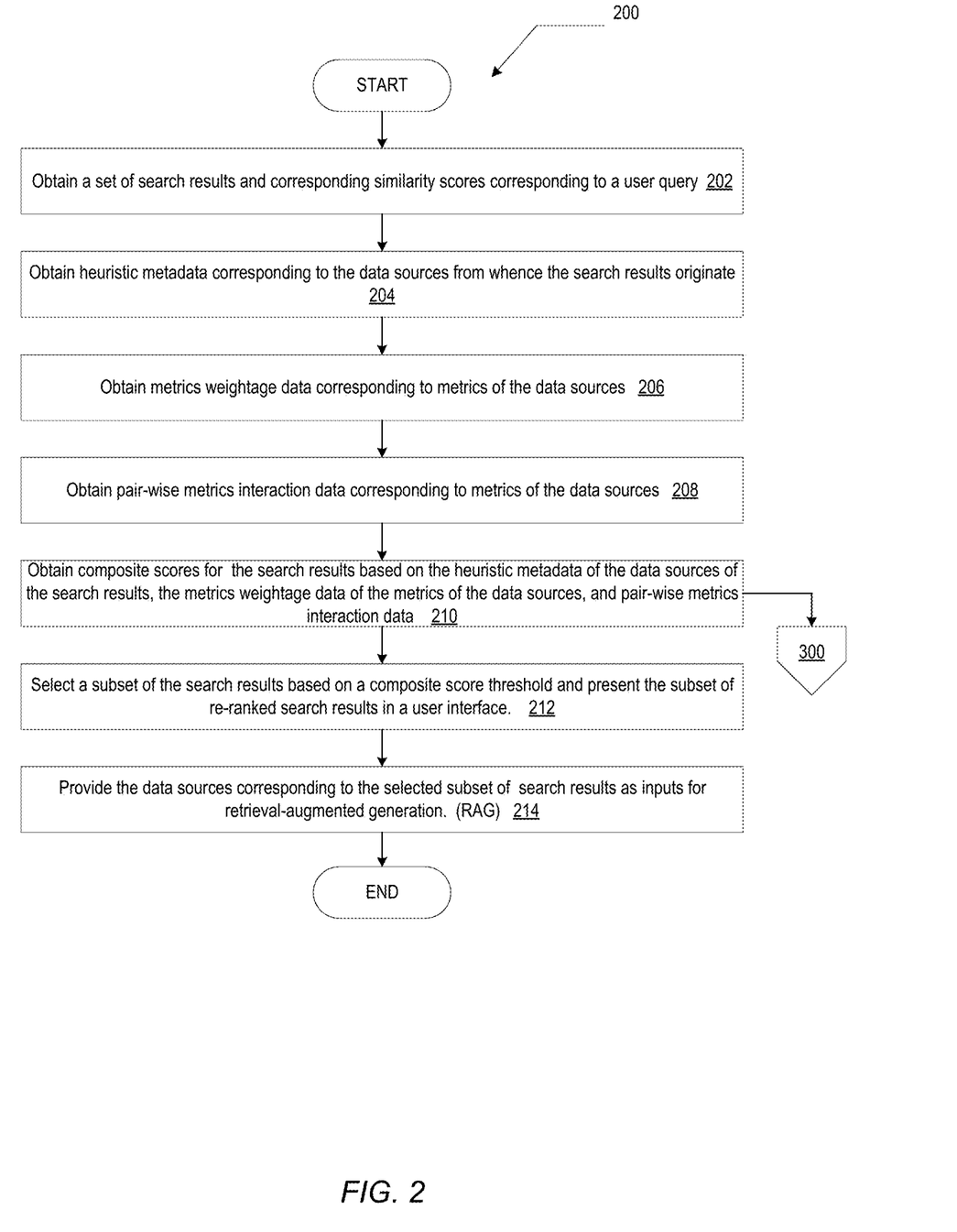
FIG. 2 and FIG. 3 show a flowchart of a method, in accordance with one or more embodiments.

FIG. 2 shows a flowchart 200 of a method to present re-ranked search results originating from disparate data sources, informed by heuristic metadata, in accordance with one or more embodiments. The method of FIG. 2 may be implemented using the system of FIG. 1 and one or more of the steps may be performed on or received at one or more computer processors. While the various steps in flowchart 200 are presented and described sequentially, at least some of the steps may be executed in different orders, may be combined, or omitted, and at least some of the steps may be executed in parallel. Furthermore, the steps may be performed actively or passively.

The flowchart 200 starts at Block 202. In Block 202, a set of search results and corresponding similarity scores corresponding to a user query is obtained. In one or more embodiments, multiple search results and corresponding similarity scores are obtained as a response to the user query. Additionally, data sources corresponding to the multiple search results may also be obtained. In one or more embodiments, the data sources from whence the search results originate may be identified by data source identifiers.

In one or more embodiments, the user query may be received by the server computing system from the user computing system. The user query may be processed by the search engine. The search engine may obtain an embedding of the user query from the embedding generator and search the vector store for similar embeddings. The search engine may retrieve the similar embeddings based on a similarity score of the user query embedding with respect to an embedding from the vector store. The similarity score of the user query with respect to an embedding from the vector store may be computed using a similarity function. The retrieved embeddings may form a search result set. Each search result of the search result set may have a corresponding similarity score with respect to the user query embedding. Further, the results ranking engine may obtain the search results and corresponding similarity scores from the search engine.

In Block 204, heuristic metadata corresponding to the data sources from whence the search results originate may be obtained. The step(s) of Block 204 may be performed concurrently, or in parallel with the retrieval steps of Block 202. In one or more embodiments, the heuristic metadata corresponding to the data sources may be obtained by the result ranking engine from the data repository. The heuristic metadata may correspond to a particular use case in which the data source is accessed. Notably, the heuristic metadata may include raw scores corresponding to one or more metrics of the data source. Thus, the raw scores of the metrics may pertain to the performance of the data source as a knowledge source for the particular use case.

To obtain the heuristic metadata of the data source, the search result may be initially analyzed to ascertain a use case that may include similar user queries and corresponding search results. The use case may be characterized in a sample dataset. For example, if the user query is a request for a GraphQL code snippet to obtain customer first names from the "ABC" application, the result ranking engine may refer to sample datasets having similar user queries for, and search results from, "ABC" application schemas. The result ranking engine may further obtain heuristic metadata corresponding to the "ABC" application schema data source. Further, the result ranking engine may refer to sample datasets having code snippet requests and may obtain heuristic metadata corresponding to code base data sources. Thus, in Block 204, the heuristic metadata of data sources corresponding to the search results may be identified based on the user query similarity to use cases characterized in the sample datasets. In one or more embodiments, the data source may obtain different raw scores for metrics, when used in different use cases.

In Block 206, metrics weightage data corresponding to metrics of the data sources may be obtained. Metrics weightage data may correspond to a particular use case. In one or more embodiments, the result ranking engine may obtain the metrics weightage data for the metrics of a data source in a particular use case from the data source(s) configuration data in the data repository. Notably, the weightage of the metrics of a data source may differ based on the use case. The weightage of the metrics of a data source may be obtained as a metric weight value. The weight value of a metric represents a percentage, or multiplier of the raw score of the metric. For example, if the raw score of a non-beneficial metric for latency is 10 ms, the weight of the metric may be 60%, or 0.6, if latency is a metric that is desired to be minimized.

In Block 208, pair-wise metrics interaction data corresponding to metrics of the multiple data source(s) may be obtained. In one or more embodiments, the result ranking engine may obtain pair-wise metrics interaction data for a data source in a particular use case from the data source(s) configuration data in the data repository. The pair-wise metrics interaction data is an interaction coefficient. In one or more embodiments, the interaction coefficient may be obtained for a first metric and a second metric of a metric pair. The first metric and the second metric may correspond to the data source. Additionally, or alternatively, the interaction coefficient may be obtained for a first metric of a metric pair, corresponding to a first data source, and a second metric of the metric pair, corresponding to a second data source. The interaction coefficient may characterize the nature of the interaction between the first metric and the second metric. For example, if for a particular data source, the first metric is frequency of access, and the second metric is a last updated timestamp, the interaction coefficient may reflect a positive reinforcement interaction between the two metrics. In other words, the interaction coefficient may be indicative of the condition that a data source is more desirable as a potential knowledge source if it is frequently accessed and recently update. If, on the other hand, the second metric is latency, then the interaction coefficient may reflect a negative reinforcement interaction between the two metrics, indicating that a frequently accessed data source with a high latency may slow down the answer-generation process.

Blocks 204, 206 and 208 of the flowchart 200 may serve to initialize the multi-metric analytic function of the result ranking engine.

In Block 210, composite scores for the search results may be obtained, based on the heuristic metadata of the data sources of the search results, the metrics weightage data of the metrics of the data sources, and pair-wise metrics interaction data. In one or more embodiments, the result ranking engine may input the heuristic metadata, metrics weightage data, and pair-wise metrics interaction data as parameters to a multi-metric analytic function. Further, the result ranking engine may process the multi-metric analytic function for a search result and a corresponding data source to obtain a composite score for the search result. The processing of the multi-metric analytic function is described in detail in reference to FIG. 3. In one or more embodiments, Block 210 may trigger the method shown in flowchart 300 of FIG. 3.

In Block 212, a subset of the search results may be selected based on a composite score threshold. In a similar manner, a corresponding subset of data sources may be selected. In one or more embodiments, the selected subset of search results and the selected subset of data sources may further be transmitted, to be received by a large language model (LLM). The selected subset of search results may further be processed by the LLM, to generate a natural language response to the user query. The natural language response may be displayed in a user interface. In one or more embodiments, the result ranking engine may send the selected subset of search results to the LLM. The LLM may process the search results to generate a natural language response. The server computing system may transmit the natural language response to the user computing system. The natural language response may be displayed in the user interface (web interface) of the search application.

In Block 214, the data sources corresponding to the selected subset of search results may be provided as inputs for RAG-based answer generation by the LLM. In one or more embodiments, the result ranking engine may transmit (data source identifiers corresponding to) respective data sources of respective search results of the selected subset of search results to the decision engine. The decision engine may retrieve a second set of search results from the respective data sources corresponding to the data source identifiers. The decision engine may cause the LLM to process the selected subset of search results and the second set of search results to generate a natural language response to the user query. Additionally, or alternatively, the LLM may process the selected subset of search results and invoke the decision engine to retrieve the second set of search results from the selected subset of data sources. The LLM may further process the selected subset of search result and the second set of search results to generate the natural language response. The server computing system may transmit the natural language response to the user computing system. The natural language response may be displayed in the user interface (web interface) of the search application.

Figure 3:
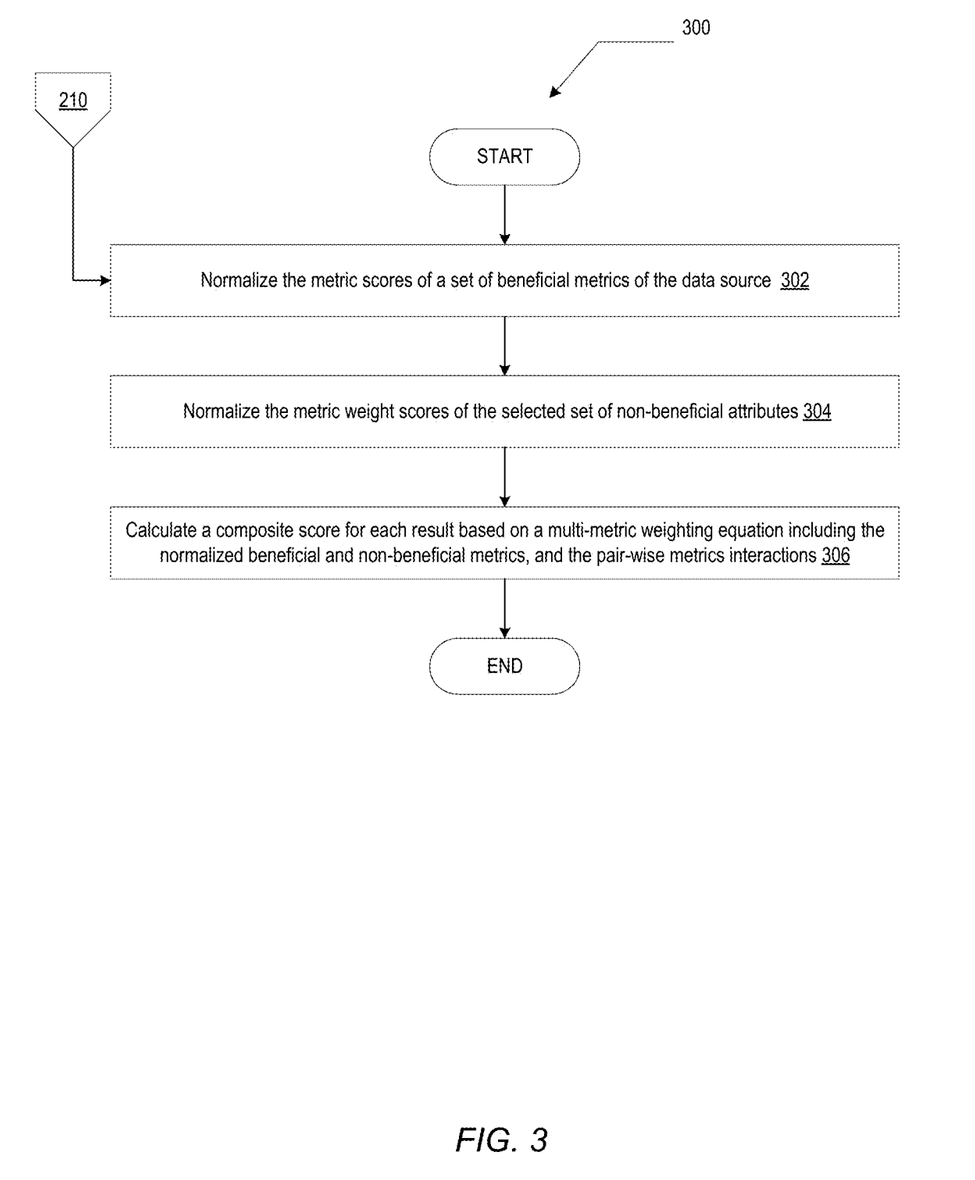

FIG. 3 shows a flowchart 300 of a method for multi-metric scoring of data source(s) for search results, in accordance with one or more embodiments. The method of FIG. 3 may be implemented using the system of FIG. 1 and one or more of the steps may be performed on or received at one or more computer processors. While the various steps in flowchart 300 are presented and described sequentially, at least some of the steps may be executed in different orders, may be combined, or omitted, and at least some of the steps may be executed in parallel. Furthermore, the steps may be performed actively or passively.

The flowchart 300 shows the workflow of a multi-metric analytic function. In one or more embodiments, the result ranking engine may invoke the execution of the multi-metric analytic function. Further, the result ranking engine may orchestrate the obtaining of input parameters to the multi-metric analytic function.

The multi-metric analytic function processes the following three equations:

$$X_i = \frac{x_i - \mu}{\sigma} \quad (1)$$

$$X_i = 1 - e^{\frac{-x_i}{\tau}} \quad (2)$$

$$\text{Score} = \beta + \sum_{j=1}^{n} (W_j \cdot X_j) + \sum_{j=1}^{n} \sum_{k \neq j}^{n} (\gamma_{jk} \cdot X_j \cdot X_k) \quad (3)$$

In Equation (1), $X_i$ is the normalized metric score of the $i^{th}$ beneficial metric of a data source. $x_i$ is the raw score of the $i^{th}$ metric of the data source. $\mu$ is the mean of the raw scores of the metric of the data source across the dataset of search results. $\sigma$ is the standard deviation of the score, ensuring zero mean and unit variance. Thus, Equation (1) transforms the raw score of a metric of a data source to a normalized score of the metric of the data source across the dataset.

In Equation (2), $X_i$ is the normalized metric score corresponding to the $i^{th}$ non-beneficial metric of the data source. $x_i$ is the raw metric score of the $i^{th}$ non-beneficial metric of the data source. $\tau$ is a scale parameter, adjusting sensitivity of exponent decay, tailored to specific range and impact of the metric score. The normalization transformation of Equation (2) ensures that as $x_i$ increases, the resulting $X_i$ decreases, thereby minimizing the negative impact of higher non-beneficial metric score values on the final score. The use of the scale parameter $\tau$ allows for flexibility in how quickly the influence of the metrics is decayed, providing a mechanism to fine-tune the sensitivity to variations in each score.

The dual normalization using different transformations for beneficial and non-beneficial metrics as shown in Equations (1) and (2) ensures that both types of metrics are appropriately scaled and contribute equally to the overall scoring. By inversely or directly (negatively or positively) reflecting their intended impacts through the different transformations, a balanced and accurate representation of data quality may be achieved, and the robustness and reliability of the scoring process may be enhanced.

Equation (3) is a multi-metric weighting equation, used to calculate a composite score for each search result. A data source may have n metrics. Score is the composite score of the search result. $\beta$ is the baseline shift of the score (bias). $W_j$ is the weight value of the $j^{th}$ metric. $X_j$ is the normalized score of the $j^{th}$ metric, obtained from either Equation (1) or Equation (2), depending on whether the $j^{th}$ metric is a beneficial metric or a non-beneficial metric. The term $W_j \cdot X_j$ is the dot product, providing the weighted contribution of the $j^{th}$ metric. Additionally, $\gamma_{jk}$ is the interaction coefficient between a $j^{th}$ metric and a $k^{th}$ metric. The dot product of $X_j$ and $X_k$ captures the combined effect of two metrics on the composite score. The dot product of $\gamma_{jk}$, $X_j$, and $X_k$ is computed.

Thus, Equation (3) accounts for both the weighted influence of individual metrics and their pair-wise interactions, allowing for a detailed and dynamic scoring system that responds to complex data relationships.

The flowchart 300 starts at Block 302. In one or more embodiments, flowchart 300 may be triggered in Block 210 of the flowchart 200. In Block 302, the metric scores of a set of beneficial metrics of the data source may be normalized. In one or more embodiments, a normalized beneficial metric score corresponding to a first metric of the data source may be obtained, in accordance with Equation (1). In one or more embodiments, the result ranking engine may initiate processing of the multi-metric analytic function. One aspect of processing the multi-metric analytic function may entail the calculation of the normalized beneficial metric score of a first metric of the data source. In Block 304, the metric scores of a set of non-beneficial metrics of the data source may be normalized. In one or more embodiments, a normalized non-beneficial metric score corresponding to a first metric of the data source may be obtained in accordance with Equation (2). One aspect of processing the multi-metric analytic function may entail the calculation of the normalized non-beneficial metric score of a first metric of the data source. Thus, the result ranking engine may obtain a normalized metric score of a metric of the multitude of metrics corresponding to the data source. The normalized metric score may include one of a normalized beneficial metric score, and a normalized non-beneficial metric score. In Block 306, a composite score is calculated for each search result, based on a multi-metric weighting equation including the normalized beneficial and non-beneficial metrics, and the pair-wise metrics interactions, in accordance with Equation (3). In one or more embodiments, a composite score of the search result, may be calculated, based on a normalized metric score of each metric of the multitude of metrics corresponding to the data source, a metrics weightage score of each metric of the multitude of metrics corresponding to the data source, and pair-wise metrics interaction data corresponding to the data source.

Figure 4:
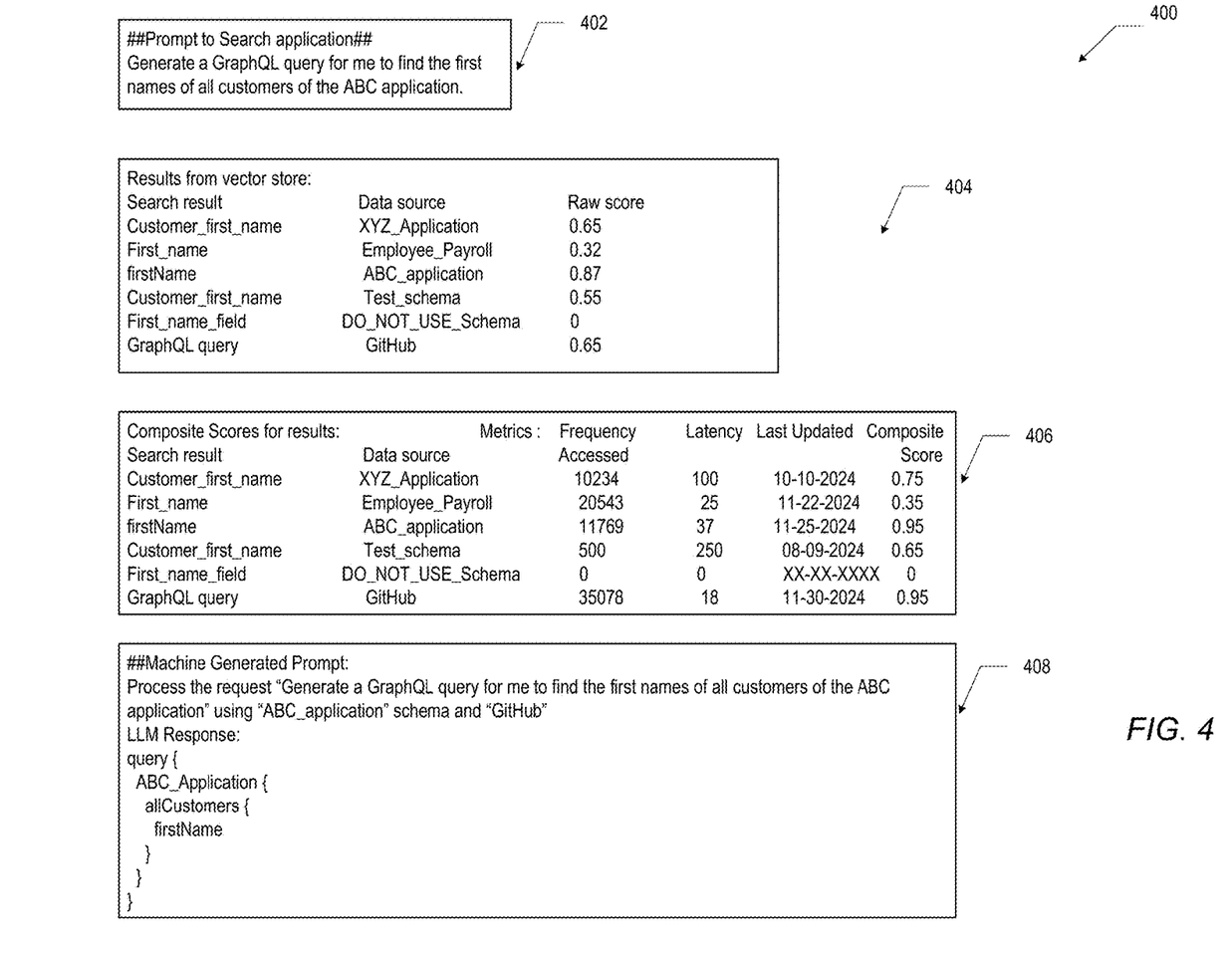
FIG. 4 shows an example of a workflow of a RAG-based application, in accordance with one or more embodiments.

FIG. 4 shows an example of a workflow of a RAG-based application, in accordance with one or more embodiments. The following example is for explanatory purposes only and not intended to limit the scope of one or more embodiments.

Block 402 shows a prompt that may be entered by a developer using the search application shown in FIG. 1. The prompt is a request to generate a GraphQL query to find the first names of all customers of the ABC application. The prompt may be received at the server computing system shown in FIG. 1, and the search engine may generate, via the embedding generator, an embedding for the user prompt. Further, the search engine may search the vector store.

The search engine may retrieve a search result set as shown in Block 404. The search results from the vector store may be a multitude of field names, retrieved from various schemas, shown under the "Data Source" heading in Block 404. For example, the field "Customer_first_name" may be part of a GraphQL schema "XYZ_Application." A duplicate field of the same name may be part of a GraphQL schema, "Test_schema." The "ABC_Application" GraphQL schema may include a field named "firstName." The search result list may further include a "GraphQL query" result, corresponding to a GitHub data source. The search results are assigned raw scores, which may be semantic similarity score values.

The result ranking engine may compute composite scores for each search result shown under the "Field" heading, in Block 406. The composite scores for each search result, and the metrics used in calculating the composite scores are shown in Block 406. For example, the composite score of the search result "firstName" is 0.95. Similarly, the composite score of the search result "GraphQL query" is 0.95. Notably, although the search result "First_name" corresponding to the data source "Employee_Payroll" schema, has a lower latency and higher access rate than the schema "ABC Application," "ABC Application" schema as a data source is computed to have a higher composite score for the search result "firstName." Thus, the selected subset of two search results and corresponding selected subset of data sources with the highest composite score are selected for further processing. In another implementation, a composite score threshold may be used to select the subset of search results.

In Block 408, the subset of search results is processed by the decision engine. The decision engine generates a machine-generated prompt. The machine-generated prompt includes the user prompt from Block 402. Additionally, the data sources are provided as part of the prompt. The machine-generated prompt of the decision engine is processed by the LLM. In processing the prompt, the LLM may invoke the decision engine to obtain a second set of search results from the selected subset of data sources. The LLM may process the selected subset of search results and the second set of search results to generate a natural language response to the user query, including a code snippet. The LLM generates a GraphQL query, using an aggregate field from the "ABC Application" schema, "allCustomers."

Thus, as shown in the example of FIG. 4, heuristic metadata related to the data sources from which the search results originate is used to further rate the search results via the composite score measure.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or microcores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
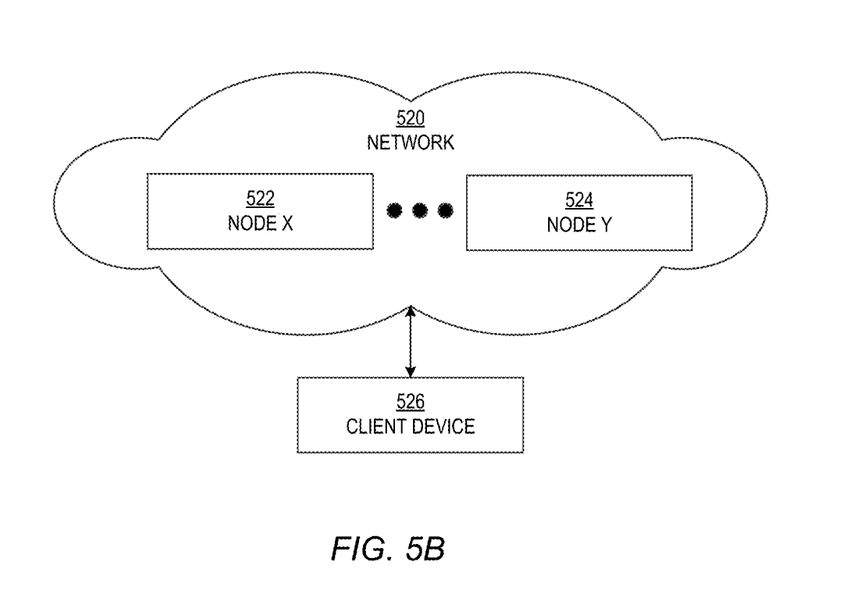

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    obtaining, as a response to a user query, a plurality of search results and corresponding similarity scores;
    obtaining a plurality of data sources corresponding to the plurality of search results;
    processing a multi-metric analytic function for a search result of the plurality of search results, and a data source of the plurality of data sources that corresponds to the search result, to obtain a composite score for the search result;
    selecting a subset of search results from the plurality of search results based on a composite score threshold to obtain a selected subset of search results;
    selecting a corresponding subset of data sources from the plurality of data sources to obtain a selected subset of data sources; and
    generating a prompt to a large language model (LLM), including at least the user query, the selected subset of search results, and the selected subset of data sources.

2. The method of claim 1, further comprising:
    receiving, by the LLM, the prompt;
    processing, by the LLM, the prompt, by:
        retrieving a second set of search results from the selected subset of data sources, and
        processing the selected subset of search results and the second set of search results to generate a natural language response to the user query; and
    displaying the natural language response.

3. The method of claim 1, further comprising:
    populating a vector store with embeddings, wherein the embeddings are vector representations of content at least one data source; and
    retrieving, by a search engine, at least one embedding from the vector store that matches an embedding of the user query, to obtain the plurality of search results, wherein matching is determined by a similarity function value of the at least one embedding from the vector store and the embedding of the user query being higher than a similarity threshold.

4. The method of claim 1, further comprising:
    initializing the multi-metric analytic function by:
        obtaining heuristic metadata corresponding to the data source, wherein the heuristic metadata includes a plurality of raw scores corresponding to a plurality of metrics of the data source,
        obtaining metrics weightage data corresponding to the plurality of metrics of the data source,
        obtaining pair-wise metrics interaction data corresponding to the plurality of metrics of the data source, and
        inputting the heuristic metadata, metrics weightage data, and pair-wise metrics interaction data as parameters to the multi-metric analytic function.

5. The method of claim 4, wherein obtaining pair-wise metrics interaction data further comprises:
    obtaining an interaction coefficient for a first metric and a second metric of a metric pair, wherein the first metric and the second metric correspond to the data source.

6. The method of claim 4, wherein obtaining pair-wise metrics interaction data further comprises:
obtaining an interaction coefficient for a first metric of a metric pair, corresponding to a first data source, and a second metric of the metric pair, corresponding to a second data source.

7. The method of claim 1, wherein processing the multi-metric analytic function further comprises:
obtaining a normalized beneficial metric score corresponding to a first metric of the data source.

8. The method of claim 1, wherein processing the multi-metric analytic function further comprises:
obtaining a normalized non-beneficial metric score corresponding to a first metric of the data source.

9. The method of claim 1, wherein processing the multi-metric analytic function further comprises:
obtaining a normalized metric score of a metric of a plurality of metrics corresponding to the data source, wherein the normalized metric score comprises one of a normalized beneficial metric score, and a normalized non-beneficial metric score.

10. The method of claim 1, wherein processing the multi-metric analytic function further comprises calculating a composite score of the search result, based on:
a normalized metric score of each metric of a plurality of metrics corresponding to the data source,
a metrics weightage score of each metric of the plurality of metrics corresponding to the data source, and
pair-wise metrics interaction data corresponding to the data source.

11. A system comprising:
at least one computer processor;
a data repository;
a search engine, executing on the at least one computer processor;
a decision engine, executing on the at least one computer processor; and
a large language model (LLM) executing on the at least one computer processor; and
a result ranking engine, executing on the at least one computer processor, and configured to:
obtain, from the search engine, as a response to a user query, a plurality of search results and corresponding similarity scores;
obtain a plurality of data sources corresponding to the plurality of search results;
process a multi-metric analytic function for a search result of the plurality of search results, and a data source of the plurality of data sources that corresponds to the search result, to obtain a composite score for the search result;
select a subset of search results from the plurality of search results based on a composite score threshold to obtain a selected subset of search results;
select a corresponding subset of data sources from the plurality of data sources to obtain a selected subset of data sources;
cause the decision engine to generate a prompt to the LLM, including at least the user query, the selected subset of search results, and the selected subset of data sources;
cause the LLM to process the prompt, by:
retrieving, by the decision engine, a second set of search results from the selected subset of data sources, and
processing, the selected subset of search results and the second set of search results to generate a natural language response to the user query; and
display the natural language response in a search application.

12. The system of claim 11, further comprising:
an embedding generator, configured to populate a vector store with embeddings,
wherein the embeddings are vector representations of content at least one data source, and
wherein the search engine is further configured to retrieve at least one embedding from the vector store that matches an embedding of the user query, to obtain the plurality of search results, wherein matching is determined by a similarity function value of the at least one embedding from the vector store and the embedding of the user query being higher than a similarity threshold.

13. The system of claim 11, wherein the result ranking engine is further configured to:
initialize the multi-metric analytic function by:
obtaining heuristic metadata corresponding to the data source, wherein the heuristic metadata includes a plurality of raw scores corresponding to a plurality of metrics of the data source,
obtaining metrics weightage data corresponding to the plurality of metrics of the data source,
obtaining pair-wise metrics interaction data corresponding to the plurality of metrics of the data source, and
inputting the heuristic metadata, metrics weightage data, and pair-wise metrics interaction data as parameters to the multi-metric analytic function.

14. The system of claim 13, wherein obtaining pair-wise metrics interaction data further comprises:
obtaining an interaction coefficient for a first metric and a second metric of a metric pair, wherein the first metric and the second metric correspond to the data source; and
obtaining an interaction coefficient for a first metric of a metric pair, corresponding to a first data source, and a second metric of the metric pair, corresponding to a second data source.

15. The system of claim 11, wherein the result ranking engine is further configured to process the multi-metric analytic function by:
obtaining a normalized beneficial metric score corresponding to a first metric of the data source, and
obtaining a normalized non-beneficial metric score corresponding to a second metric of the data source.

16. The system of claim 11, wherein the result ranking engine is further configured to process the multi-metric analytic function by obtaining a normalized metric score of a metric of a plurality of metrics corresponding to the data source, wherein the normalized metric score comprises one of a normalized beneficial metric score, and a normalized non-beneficial metric score.

17. The system of claim 11, wherein the result ranking engine is further configured to process the multi-metric analytic function by calculating a composite score of the search result, based on:
a normalized metric score of each metric of a plurality of metrics corresponding to the data source,
a metrics weightage score of each metric of the plurality of metrics corresponding to the data source, and
pair-wise metrics interaction data corresponding to the data source.

18. A method, comprising:
- receiving a user query from a search application;
- obtaining a plurality of search results corresponding to the user query from a vector store;
- obtaining a plurality of data sources corresponding to the plurality of search results;
- determining composite scores corresponding to the plurality of search results by processing the plurality of data sources by a multi-metric analytic function;
- selecting a subset of search results from the plurality of search results based on a composite score threshold to obtain a selected set of search results;
- selecting a corresponding subset of data sources from the plurality of data sources to obtain a selected set of data sources;
- generating a prompt to a large language model (LLM) including the user query, the selected set of search results, and the selected set of data sources; and
- generating, by the LLM, an answer to the user query, in response to the prompt.

19. The method of claim 18, further comprising:
- generating, by the LLM, an answer to the user query, in response to the prompt, by:
  - retrieving a second set of search results from the selected set of data sources, and
  - processing the selected set of search results and the second set of search results to generate a natural language response to the user query.

20. The method of claim 18, wherein processing the plurality of data sources by the multi-metric analytic function further comprises calculating a composite score of a first search result of the plurality of search results, based on:
- a normalized metric score of each metric of a plurality of metrics corresponding to a first data source, wherein the first data source corresponds to the first search result;
- a metrics weightage score of each metric of the plurality of metrics corresponding to the first data source, and
- pair-wise metrics interaction data corresponding to the data source.

* * * * *